US006886493B1

(12) United States Patent
Deneintolis et al.

(10) Patent No.: US 6,886,493 B1
(45) Date of Patent: May 3, 2005

(54) MOTOR ASSISTED SWIVEL

(75) Inventors: Anthony Deneintolis, Falmouth, MA (US); John Kauker IV, Bellingham, MA (US); James Burke, III, Londonderry, NH (US)

(73) Assignee: Pro Med-Tec, Inc., Bellingham, MA (US)

( * ) Notice: Subject to any disclaimer, the term of this patent is extended or adjusted under 35 U.S.C. 154(b) by 0 days.

(21) Appl. No.: 10/684,110

(22) Filed: Oct. 10, 2003

(51) Int. Cl.[7] .............................................. A01K 29/00
(52) U.S. Cl. ................................... 119/174; 119/427
(58) Field of Search ............................... 119/174, 417, 119/421, 427, 712, 769, 779, 784, 786, 785, 787, 789, 791

(56) References Cited

U.S. PATENT DOCUMENTS

| | | | | |
|---|---|---|---|---|
| 4,756,707 A | * | 7/1988 | MacLeod et al. ........... 604/261 |
| 5,305,712 A | * | 4/1994 | Goldstein .................... 119/784 |
| 5,816,256 A | * | 10/1998 | Kissinger et al. ........... 128/897 |
| 5,832,878 A | * | 11/1998 | Bonsall et al. .............. 119/769 |
| 6,062,224 A | * | 5/2000 | Kissinger et al. ........... 128/897 |
| 6,279,511 B1 | * | 8/2001 | Loughnane ................. 119/769 |
| 6,314,916 B1 | * | 11/2001 | Watson, Sr. ................. 119/788 |
| 6,820,573 B1 | * | 11/2004 | McMullin .................... 119/791 |

* cited by examiner

Primary Examiner—Yvonne R. Abbott
(74) Attorney, Agent, or Firm—Mintz, Levin

(57) ABSTRACT

A motor assisted swivel is disclosed which aids in proper rotation of a swivel in a tether system for animal testing. The swivel may have any number of fluid conduits or electrical or optical leads. A switching mechanism determines a direction of rotation of the tether and activates a motor to rotate the swivel in the direction of rotation. When rotation of the tether stops, further rotation of the swivel causes the switching mechanism to deactivate the motor. The switching mechanism may include a hinged connector with magnets on each side and reed switches to sense movement of the connector about its hinge.

15 Claims, 4 Drawing Sheets

MOTOR ASSISTED SWIVEL

BACKGROUND OF THE INVENTION

1. Field of the Invention

The present invention relates to swivels in tethers for animal testing and monitoring. More particularly, it relates to motorized swivels for small animals.

2. Discussion of Related Art

Animal testing is an important part of pharmaceutical and biomedical research. During such tests, the animals are placed in a cage and various devices external to the cage, such as syringe pumps, fraction collectors, electrometers, vacuum sources, light sources, and potentiostats, are connected to implants in the animal's body such as infusion cannula, ultrafiltration probes, microdialysis probes, or electrodes. The means for connecting the external devices to the implants are typically lengths of flexible, hollow, plastic tubing, flexible wires, or optical fibers. Generally, effective animal testing requires the animal to be able to function in a substantially normal manner within the cage. However, the connections to external infusion or testing devices can inhibit normal movement of the animal. In order to allow the animal to move as freely as possible, various tether systems have been developed. These systems seek to minimize the effect of the testing apparatus on the animal. The tubes or wires are hung from a point above the cage to provide a flexible connection to the animal.

A tether allows the animal to move about the cage. However, when the animal turns or rotates, the tether system can become tangled. Swivels have been developed to allow rotation of a tether so that animal movement is not inhibited and the tether continues to function properly. Such swivels may include liquid swivels with one or more lines of tubing, electrical swivels with one or more electrical or optical lines, or combination swivels with tubing and electrical or optical lines. Liquid swivels are designed so that the top and bottom half rotate independently and an internal seal connects the two halves. When the connection is electrical or optical, a form of commutator is required. For liquid swivels and swivel commutators, the lead is discontinuous, i.e., it is somehow "split" at the swivel, so that the bottom half of the lead may be required to rotate with respect to the top half of the lead. Seals are required to prevent leakage from a swivel.

Swivels can be problematic. They can be stiff and hard to turn, which limits the usefulness of the swivel. If a swivel stops rotating the animal's movement may be restricted and experimenter intervention is required to remove twists from the tether. The result is that the ideal of a stress-free environment for the animal under study is difficult or impossible to achieve with currently available equipment. Such problems are most prevalent with small test animals, such as mice, since the forces exhibited by the animal on the tether system, and hence the swivel, are small.

Some prior art equipment seeks to eliminate the problems of swivels by removing the swivel from the system. Instead of a swivel, a complex rotation system is used to prevent twisting of the tether. For example, U.S. Pat. No. 5,816,256 discloses a system for rotating a housing to prevent tangling of test leads on a test animal. The system includes a sensor assembly including two optical sensors. The tether to the animal is connected to the sensor assembly and can rotate within the assembly. However, when the tether rotates sufficiently far to activate one of the optical sensors, the cage is rotated in the same direction as animal rotation. Rotation of the cage prevents the tether from tangling and eliminates the need for a swivel. Cage rotation, however, can be confusing for an animal, as its environment is changing. Thus, the test equipment creates stimuli which can adversely affect the experiments.

In another design, U.S. Pat. No. 5,832,878 resolves the problem of stress to the animal due to rotation of the cage by providing a turntable positioned over the cage. The turntable holds all of the equipment, such as syringes or electronics, necessary for the test. Magnetic sensors are uses to detect rotation of the tether. A magnet is positioned on a tube of the tether. The tube is positioned in the center of the tether. As the tube rotates, sensors detect the rotation and operates a motor to rotate the turntable. Such a system is large, cumbersome and expensive. The rotating turntable must be large and rugged to handle the potentially significant amount of test equipment. Other prior art devices, such as U.S. Pat. No. 6,279,511 use various other turntable devices for rotating the tether and test equipment.

A need exists for a simple system for preventing tangling of tethers and to ensure proper operation of swivels in animal testing.

SUMMARY OF THE INVENTION

The present invention overcomes many deficiencies of prior art systems by providing a motor assisted swivel. A swivel is used as is known in animal testing. The swivel is suspended from a motor which can rotate the halves of the swivel relative to each other. A switching mechanism attached to the tether is used to determine rotation of the tether and to activate the motor for rotation of the swivel.

According to an aspect of the invention, the switching mechanism includes a magnet swivel hingedly attached to a turn plate of the motor assisted swivel. Sensors positioned on the turn plate determine movement of the magnet swivel. As the test animal moves, the magnet swivel rotates on the hinge and is detected by the sensors. The control logic on the device operates the motor to rotate the swivel in the direction of the sensed motion. Once the swivel has been rotated sufficiently far, the magnet swivel will rotate on its hinge in the opposite direction. This movement will be detected by the sensors and stop rotation of the motor.

DETAILED DESCRIPTION

Figure 1:
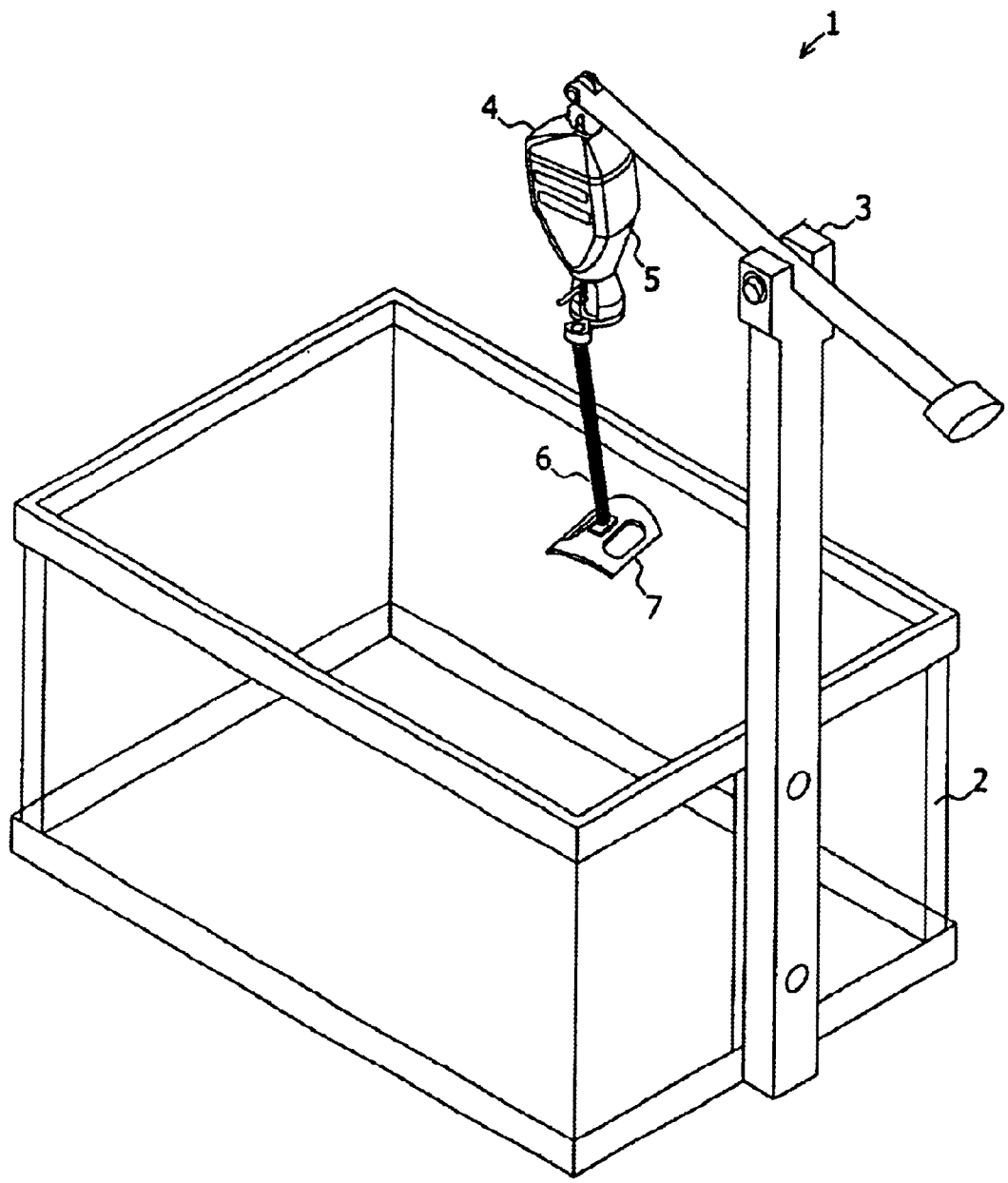
FIG. 1 is a perspective view of a test cage including a motor assisted swivel according to an embodiment of the present invention.

As illustrated in FIG. 1, the present invention includes a motor assisted swivel 4 for use in an animal tether system 1 for animal observation and/or testing. In such a system, a test animal (not shown), such as a rat or mouse, is placed in a containment area 2 for performance of a test. As is known in such systems, a jacket 7 is worn by the test animal. The jacket 7 is connected to a tether 6. The tether 6 may include tubing or electrical or optical leads, which are connected to the test animal. The tether 6 is used to provide drugs to the animal or to monitor the condition of the animal. As is also known in such tether systems, the tether 6 is connected to a counterbalance arm 3 suspended above the containment area 2. The counterbalance arm 3 responds to vertical movement of the animal in order to prevent tangling of the tether with the test animal. Of course, the counterbalance arm may be omitted for the tether system, as is known in the art.

Figure 2:
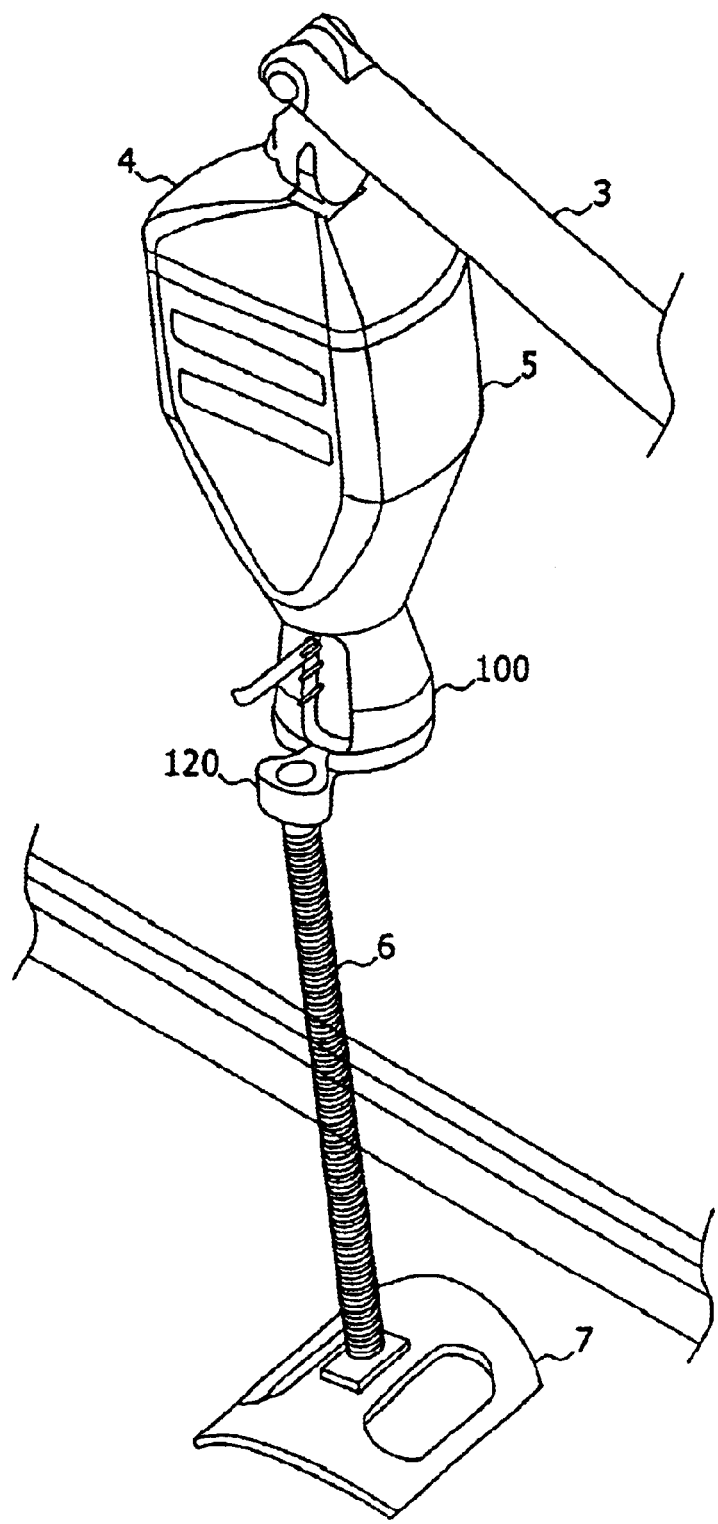
FIG. 2 is a perspective view of the motor assisted swivel of FIG. 1.

The present invention includes a motor assisted swivel 4 connected to the tether 6. FIG. 2 illustrates the motor assisted swivel 4 of FIG. 1. The motor assisted swivel 4 according to an embodiment of the present invention is positioned in the tether system 1 at the location of known swivels. The motor assisted swivel 4 is suspended from the end of the counterbalance arm 3. If the counterbalance arm is omitted from the system, the motor assisted swivel 4 could be attached to a side or a cover of the containment area 2. The tether 6 is attached to a switching mechanism 120 of the motor assisted swivel 4. The motor assisted swivel 4 includes a motor 5 and a swivel rotation section 100.

Figure 3:
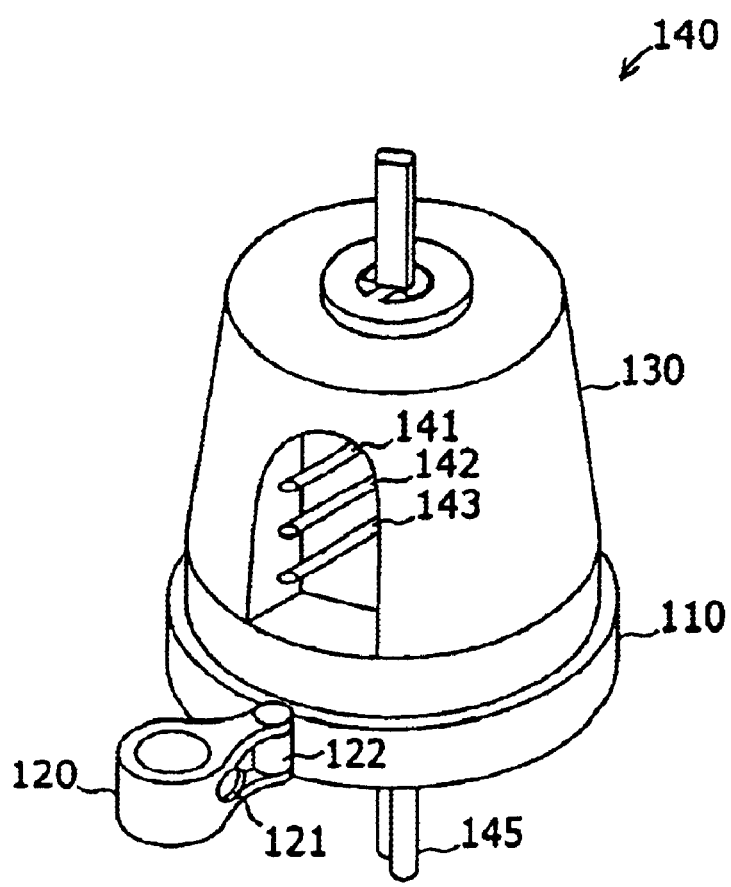
FIG. 3 is a perspective view of the swivel of FIG. 1.
Figure 4:
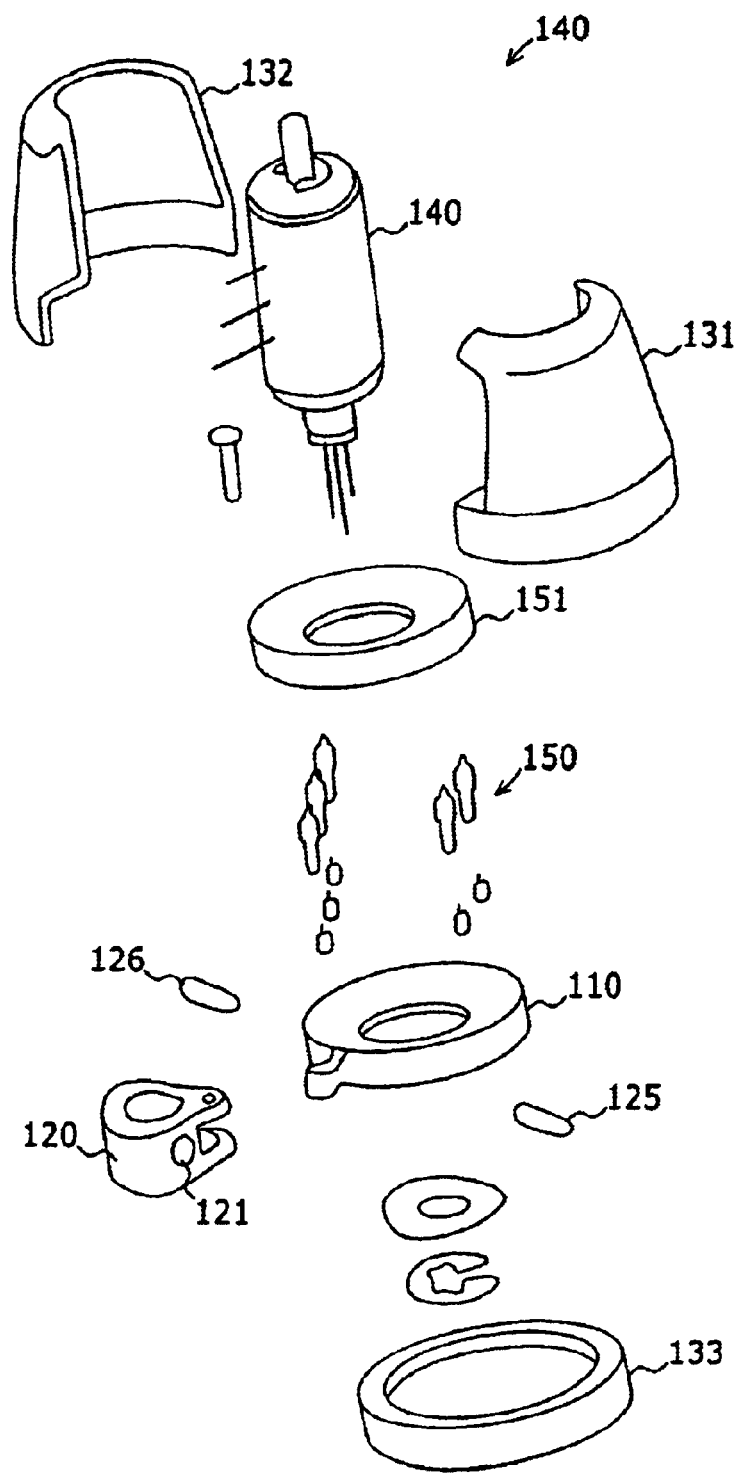
FIG. 4 is a exploded view of the components of the swivel of FIG. 1.

An embodiment of the swivel rotation section 100 is illustrated in FIG. 3, and the components are illustrated in FIG. 4. As illustrated in FIGS. 3 and 4, the swivel rotation portion includes a swivel 140 of known design. The swivel 140 may be a fluid swivel, electrical or optical swivel, or combination swivel. The swivel 140 may be of a known design, or may be specifically designed for use in the motor assisted swivel 100 of the present invention. The swivel 140, as is known in the prior art, includes various inputs 141, 142, 143 and outputs 145. The inputs and outputs may be fluid tubes or electrical or optical leads. The terms input and output represent the two ends of a conduit or lead through the swivel. Fluid or signals may be passed in either direction through the swivel. The outputs 145 are connected to the tubes of the tether 6 for connection to the test animal.

As with known swivels, the swivel 140 includes two halves so that the outputs 145 can rotate relative to the inputs 141, 142, 143. A rotation plate 110 is connected to the output end of the swivel 140 in such a manner that rotation of the rotation plate results in rotation of the output part of the swivel 140. The rotation plate is connected to the motor 5. When the motor 5 is engaged, the rotation plate 110 is turned, which rotates the output part of the swivel 140.

The switching mechanism 120 is hingedly attached to the rotation plate 110 for movement in the same plane as the rotation plate 110. When the animal moves, the tether causes the switching mechanism to move on its hinge 122. Two magnets 121 (one is not visible) are placed on the two sides of the switching mechanism 120. Reed switches 125, 126 are placed in the rotation plate 110 near the hinge 122 of the switching mechanism 120. As the switching mechanism 120 moves, the reed switches 125, 126 sense the proximity of the magnets 121 to the reed switches. When a reed switch 125, 126 is activated by the magnet 121 moving sufficiently close to the rotation plate 110, the motor 5 is activated to rotate the rotation plate 110 in the direction of the activated reed switch 125, 126. Once the rotation plate 110 has rotated sufficiently, further rotation of the rotation plate 110 causes the switching mechanism 120 to rotate on its hinge 122 in a direction opposite to the direction of motion of the rotation plate 110. Movement of the switching mechanism 120 on its hinge will cause the magnet 121 to move away from the reed switch 125, 126. Movement of the magnet 121 deactivates the reed switch 125, 126 and stops the motor 5.

Contacts 150 are used to transfer signals from the reed switches to the motor and control logic. The contacts 150 operate with a contact ring 151 in a known manner to maintain the contacts upon relative rotation of the rotation plate 110 and the contract ring 151. Control logic (not shown) is contained within the motor assisted switch 4 for determining the state of the reed switches and activating the motor. Preferably, the control logic is an integrated circuit housed with the motor 5. A housing 130 surrounds the swivel rotation section 100.

An embodiment of the swivel rotation section 100 has been disclosed. However, the present invention is not limited solely to the disclosed embodiment. Other designs could also be used for the swivel rotation section. The swivel rotation section 100 requires a swivel, a mechanism for connecting the swivel to a motor for driving one or both parts of the swivel, and a sensor for detecting rotation of the tether and activating the motor. Other types of sensors could be used, including contact and non-contact switches, for determining rotation of the tether. Other designs may also be used for driving rotation of the swivel.

Having described at least one embodiment of the invention, modifications, adaptations and improvements will be readily apparent to those of ordinary skill in the art. Such modification, changes and adaptations are considered part of the invention.

What is claimed is:

1. A tether system for animal testing comprising:

a tether connectable to an animal;

a swivel attached to the tether, the swivel having parts rotatable relative to each other;

at least one conduit within the tether and swivel; and a motor connected to the swivel for rotating at least one part of the swivel relative to another part.

2. The tether system of claim 1, wherein the at least one conduit includes a fluid channel.

3. The tether system of claim 1, wherein the at least one conduit includes an electrical lead.

4. The tether system of claim 1, wherein the at least one conduit includes an optical lead.

5. The tether system of claim 1, further comprising:

a sensor mechanism for detecting rotation of the tether; and a motor control system activating the motor when the sensor detects rotation of the tether.

6. The tether system of claim 5, wherein the sensor mechanism includes:

a tether connector attached to the tether;

a hinge connecting the tether connector to a rotatable part of the swivel, the hinge having an axis substantial parallel to an axis of rotation of the swivel; and a sensor for determining a position of the tether connector on the hinge.

7. The tether system of claim 6, wherein the sensor includes:

at least one magnet on the tether connector; and at least one reed switch on the swivel.

8. The tether system of claim 1, further comprising a cantilever balance arm attached to the swivel so that the swivel is positioned above the animal.

9. The tether system of claim 8, wherein the motor is suspended from the cantilever arm.

10. A motor assisted swivel comprising:

a swivel attached to the tether, the swivel having parts rotatable relative to each other;

at least one conduit within the swivel; and a motor connected to the swivel for rotating at least one part of the swivel relative to another part.

11. The motor assisted swivel of claim 10, further comprising:
   a sensor mechanism for detecting rotation of a tether connected to the swivel; and
   a motor control system activating the motor when the sensor detects rotation of the tether.

12. The motor assisted swivel of claim 11, wherein the sensor mechanism includes:
   a tether connector attached to the tether;
   a hinge connecting the tether connector to a rotatable part of the swivel, the hinge having an axis substantial parallel to an axis of rotation of the swivel; and
   a sensor for determining a position of the tether connector on the hinge.

13. The motor assisted swivel of claim 12, wherein the sensor includes:
   at least one magnet on the tether connector; and
   at least one reed switch on the swivel.

14. A method for rotating a swivel in a tether system for animal testing, the swivel having parts rotatable relative to each other, the method comprising the steps of:
   detecting a direction of rotation of a tether in the tether system; and
   activating a motor connected to at least one part of the swivel to rotate the at least one part of the swivel relative to another part of the swivel in the detected direction of rotation of the tether.

15. The method for rotating a swivel according to claim 14, further comprising the steps of:
   detecting a cessation of rotation of the tether; and
   deactivating the motor to cease rotation of the at least one part of the swivel upon detection of a cessation in rotation of the tether.

* * * * *